(12) United States Patent
Hwang

(10) Patent No.: US 9,188,806 B2
(45) Date of Patent: Nov. 17, 2015

(54) MULTI-PURPOSE ELECTRICAL WINDOW AND METHODS THEREOF

(71) Applicant: Yu-Chen Hwang, Xinwu Township (TW)

(72) Inventor: Yu-Chen Hwang, Xinwu Township (TW)

( * ) Notice: Subject to any disclaimer, the term of this patent is extended or adjusted under 35 U.S.C. 154(b) by 53 days.

(21) Appl. No.: 13/959,437

(22) Filed: Aug. 5, 2013

(65) Prior Publication Data

US 2014/0247408 A1 Sep. 4, 2014

(30) Foreign Application Priority Data

Mar. 1, 2013 (TW) .............................. 102107171 A

(51) Int. Cl.
*G02F 1/1334* (2006.01)
*G02F 1/1335* (2006.01)

(52) U.S. Cl.
CPC ........ *G02F 1/133526* (2013.01); *G02F 1/1334* (2013.01); *G02F 2001/133616* (2013.01); *Y10T 29/49147* (2015.01)

(58) Field of Classification Search
CPC ................................................ G02F 1/133526
USPC ................................. 349/16, 57, 95
See application file for complete search history.

(56) References Cited

U.S. PATENT DOCUMENTS

| 7,505,188 | B2 | 3/2009 | Niiyama et al. | |
| 8,290,318 | B2 * | 10/2012 | Vasylyev | 385/33 |
| 2012/0236393 | A1 | 9/2012 | Slovak et al. | |
| 2014/0176836 | A1 * | 6/2014 | Brecht et al. | 349/16 |

FOREIGN PATENT DOCUMENTS

WO WO2013036386 A1 3/2013

* cited by examiner

*Primary Examiner* — James Dudek
(74) *Attorney, Agent, or Firm* — George P. White

(57) ABSTRACT

These teachings disclose a multi-purpose electric window that comprises a printed transparent sheet and a reflective layer laminated onto an electric light-switching device and a power source. The electric light-switching device is made of electrically actuated polymer dispersed liquid crystal or suspended polarized particles laminated between two transparent electrodes. There are surface lens structures at one side or both sides of the transparent sheet. Images are printed unto the surface lens structures. The lens structures are selected from prism, half spherical, half cylindrical, pyramidal, Fresnel structure or a combination of the above. The transparent sheet is laminated on the side with reflective layer or the other side of the electric light-switching device without reflective layer. Light emitting diodes can be placed at the sides or under the transparent sheet.

12 Claims, 7 Drawing Sheets

MULTI-PURPOSE ELECTRICAL WINDOW AND METHODS THEREOF

RELATED APPLICATION

This application claims priority of Taiwan Patent Application No. 102107171, filed on Mar. 1, 2013, the entire disclosure of which is hereby incorporated herein by reference.

BACKGROUND

There are two major types of active electric windows, PDLC (polymer dispersed liquid crystal) and suspended particle device (SPD).

PDLC technology requires micrometer sized liquid crystals to be scattered in an organic polymeric matrix. The optical axes of the liquid crystals (LCs) are normally in random orientations. Therefore, light is scattered to different directions due to the mismatch of refraction indexes between the LCs and the polymer matrix. This makes the electric window non-transparent. However, an electric field can be applied to control and align the optical axes of LCs in the same direction. This makes the electric window turn clear due to the index of refraction matching between LCs and polymer matrix.

A PDLC returns to random orientation, and therefore non-transparent, when the electric field is removed. The PDLC was invented by Dr. Doane and his team in 1984 and published in U.S. Pat. No. 4,688,900. The liquid crystals are made with phase separation technology. PDLCs are made by mixing water insoluble monomers, e.g. epoxy resin and curing agent, with LCs to form a transparent solution. The LC micro particles separate out and disperse in the epoxy matrix due to decreasing solubility as the curing of epoxy proceeds. Electric windows use the LC properties of being able to be oriented by electricity and being naturally random in orientation without an imposed electric field. Light cannot pass through the random LC/epoxy mixture. LCs are aligned with an electric field, which turns translucent mixture into transparent clear.

A suspended particle device (SPD) uses rod-like particles suspended in an encapsulated liquid solution. It is laminated between two sheets of glass or plastic containing transparent electrodes. Similarly to the case of the PDLC, the suspended particles are in random orientation when no electric field is applied. Light is absorbed by particles and the window becomes dark and non-transparent. On the other hand, particles align in the same direction to allow light to transmit through the SPD when electric field is applied. Electricity can be applied to the threshold to control the amount of allowable light or heat transmitted. It becomes a tool for energy saving from air-conditioning in the summer and heating in the winter. In other words, SPD windows can reduce carbon emissions and the cost of expensive glass sealing material.

The light emitting diode (LED) is a semiconducting electronic component comprising a composite light source from inorganic trivalent and pentavalent elements. The initial application of LEDs was for indicator lighting and displays. LEDs are now used in general lighting application since the invention of white light LED. In this teaching, LEDs will be integrated with electric window technology to produce a multi-purpose electric window.

BRIEF SUMMARY

In these teachings multi-purpose electric windows with performance of high shading and high transparency effects are disclosed. In addition, electric windows can be decorated with printed images with stereoscopic effect. The resulting printed electric windows can be used for decoration, privacy shading, and an indoor partition and/or as panels for advertisement.

BRIEF DESCRIPTION OF THE DRAWINGS

For a further understanding of the present teachings, reference will be made to the following detailed description of embodiments of the invention that are to be read in connection with the accompanying drawings, wherein.

DESCRIPTION OF KEY ELEMENTS

Figure 1:
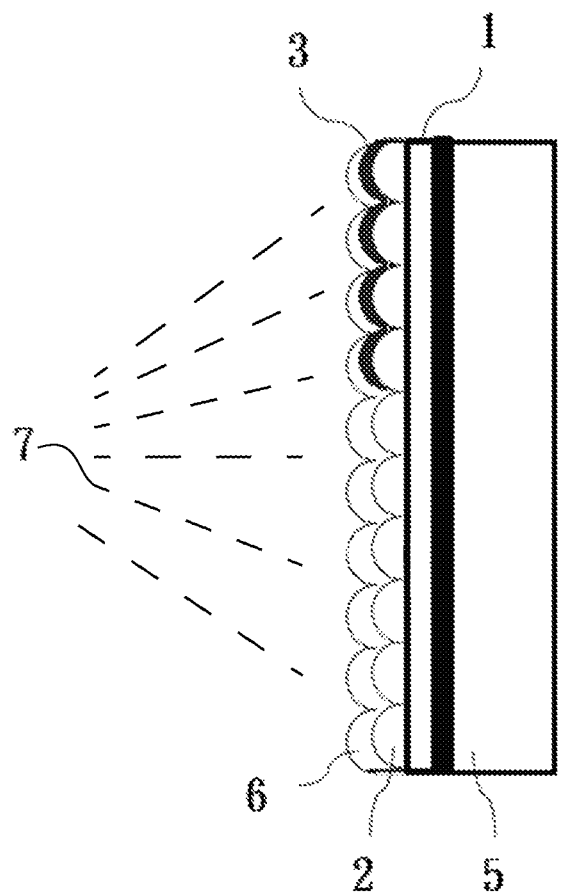
FIG. 1 is a structural diagram of a multi-purpose electric window.

1. Transparent sheet
2. Lens structures
3. Printed images
4. Reflective layer
5. Electric light-switching device
6. Image protective layer
7. Surrounding light
8. Single-sided lens sheet
9. Double-sided lens sheet
10. Transparent substrate
11. Transparent electrode
12. Liquid crystals
13. Wire
14. Power supply
15. Edge light source
16. Power controller
17. Plane light source
18. Suspended particles
G. Printed area
H. Blank area
L. Left eye
R. Right eye

DETAILED DESCRIPTION

In these teachings, a multi-purpose electric window (MPEW) is made of a commercial electric light-switching device laminated with a stereoscopic printed lens sheet. The printed lens sheet is based on a transparent sheet that can contain single-sided or double-sided concave and convex lens structures and a printed layer on the lenses. The choice of various concave and convex structures depends on the desired performance combination of light converging, scattering and/or the stereoscopic printed effect. The MPEWs in this teaching can be used to display information or various visual effects through the reflection of surrounding light and/or further integration of an external light source.

As shown in FIG. 1, one side or both sides of a transparent sheet (1) have concave and/or convex surface lens structures (2). Images can be printed onto the lens structures (2) to provide a stereoscopic visual effect for the printed images (3) through depth perception. A reflective layer (4) is designed into the electric light-switching device (5) to improve the shading efficiency when no electric field is applied. Optionally, an image protection layer (6) can be applied on top of printed images (3) to prevent images from scratching. The lens structures (2) on the transparent substrate (1) can improve the transmission of surrounding light (7) through the MPEW with electricity applied on the electric light-switching device (5). Integration of a reflective layer (4) and lens structures (2) can provide high shading and high transparency performance at the same time. The reflective layer (4) and transparent sheet (1) could be at the same side or opposite side of electric light-switching device (5). In both cases, the design enhances light shading effect. In addition, the concave and convex surfaces of the lens structures (2) are used as a surface morphology required for stereoscopic printing. It broadens the application of this teaching for attractive designs for shop windows. The printed MPEW in this teaching can be presented as a stereoscopic window decoration or an advertisement tool during the daytime, with additional high privacy shading effect during the nighttime.

The reflective layer (4) can be selected from paints with reflective powder, high refraction index materials, metal-coated film or metal reflectors with etched surface patterns. The reflective material can also enhance the brightness and contrast of the printed images (3). It can be made of transparent resins with nano-sized Titanium oxide ($TiO_2$), Zirconium Oxide ($ZrO_2$), Tin Oxide ($SnO_2$) and/or Hafnium oxide ($HfO_2$). The transparent resin can be chosen from Acrylic, polyester, epoxy, or silicon. The reflective layer (4) can also be metal-coated film or metal reflector with etched surface patterns for decorative effect.

Figure 2:
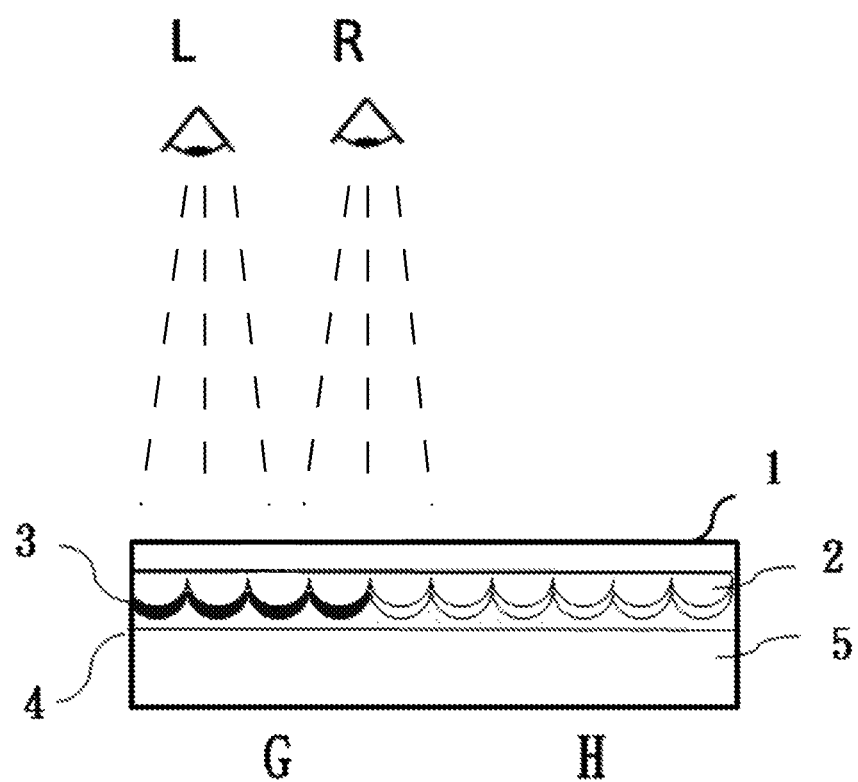
FIG. 2 is a schematic diagram to show the principles of stereoscopic visual perception.
Figure 3A:
FIG. 3A is a diagram showing a transparent single-sided lens sheet.
Figure 3B:
FIG. 3B is a diagram showing a variation of a transparent single-sided lens sheet of FIG. 3A.
Figure 3C:
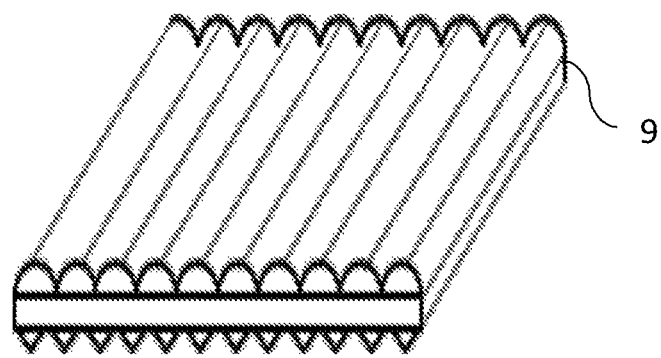
FIG. 3C is a diagram showing a transparent double-sided lens sheet.
Figure 3D:
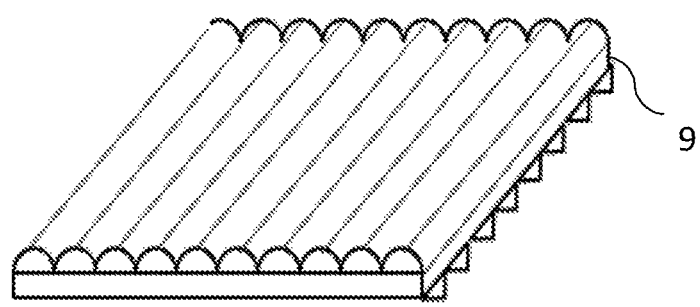
FIG. 3D is a diagram showing a variation of a double-sided transparent lens sheet of FIG. 3C.

Printing technology used in this teaching is based on a fast curing ink with ultra violet (UV) light. Ink cures and polymerizes upon exposure with UV in a few seconds. Printed images (3) dried on the surface of lens structures (2) and the surface of printed images (3) replicates the surface morphology of lens structures (2). As shown in FIG. 2, observers have different focus distances between right eye (R) and left eye (L) and the printed images (3) in printed area (G) that results in depth perception. The degree of visual offset between left eye and right eye changes along with the changes of surface geometry while observers are in motion. It creates the stereoscopic, lively and eye-catching visual effect. The result is similar to stereoscopic Moiré printing, but without having the color printing limitation and inaccuracy of chromatography printing. The printing process in this teaching can be performed with digital inkjet printing but is not limited to it.

Proper selection of lens structures (2) can achieve good light transmission and obvious stereoscopic effect at the same time. Lens sheets are made of transparent sheet (1) with surface lens structures (2) on one side or both sides of transparent sheet (1). As shown in FIG. 3, there are single-sided lens sheets (8) and double-sided lens sheets (9). The lens structures (2) can be selected from prism, half spherical, half cylindrical, pyramidal, Fresnel structure or a combination of the above and others. For a double-sided lens sheet (9), the lens structures (2) on different sides can be arranged in relatively parallel or vertical orientations. Prism and half spherical lens structures have good light enhancement effect, and half cylindrical and Fresnel lens structures have good stereoscopic effect. The lens structures in the figures are only examples and should not be seen as a limitation to this invention.

Figure 4:
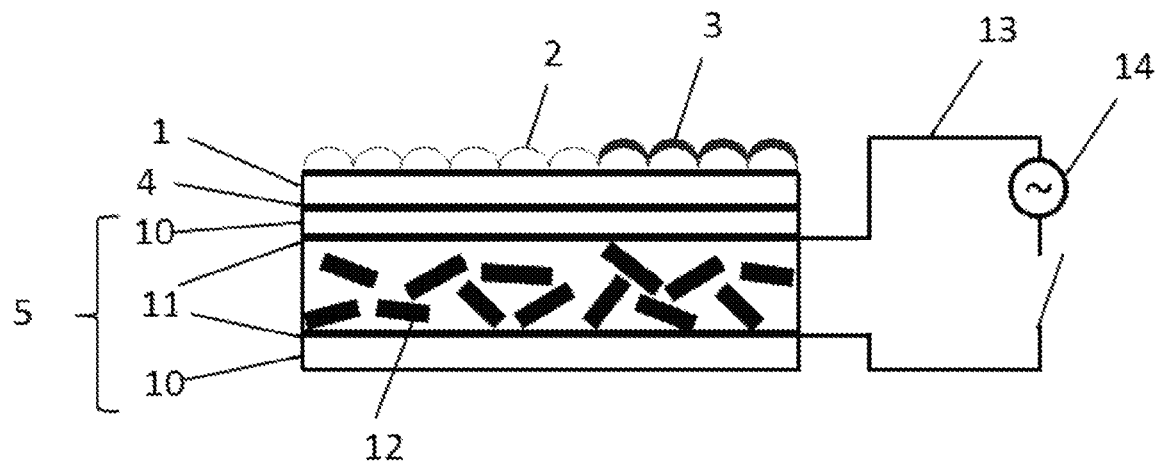
FIG. 4 is a schematic diagram of a printed polymer dispersed liquid crystal electric window with no applied electricity field.

As shown in FIG. 4, a MPEW comprising a transparent sheet (1) with surface lens structures (2), a reflective layer (4) and an electric light-switching device (5) that contains two layers of transparent electrodes (11) and a layer of electric field alignable particles and a power supply (14), wherein the lens structures (2) are located on one side or both sides of the surface of the transparent sheet, wherein the reflective layer (4) is located next to the electric light-switching device (5), wherein the transparent sheet (1) is laminated on the reflective layer (4) or on the electric light-switching device (5). The electric field alignable particles can be liquid crystals (12) or suspended particles (18). The transparent electrode can be made by sputtering metal, usually Indium Tin Oxide (ITO), on a transparent plastic sheet. The sandwich structure of two layers of transparent electrodes (11) and a layer of electric field alignable particles is encapsulated between two transparent substrates (10). The two transparent electrodes (11) are connected by wires (13) and a power supply (14). The circuit is designed to control the voltage across the transparent electrodes (1). In FIG. 4, it shows a MPEW with no voltage across the transparent electrode (11). The shading effect is enhanced by the reflective layer (4). The brightness to contrast ratio of printed images (3) on printed area (G) is also improved due to increased brightness at the non-printed blank area (H) with a reflective layer (4). The transparent sheet (1) with surface lens structures (2) can also serve as a light guiding plate to guide and distribute light from an added edge light source (15) which can be inorganic light emitting diodes (LEDs).

Figure 5:
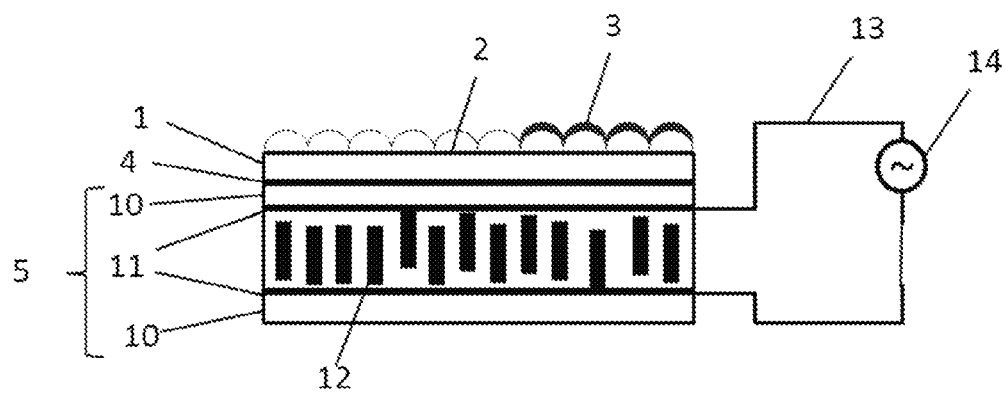
FIG. 5 is a schematic diagram of a printed polymer dispersed liquid crystal electric window with applied electricity field.

FIG. 5 represents a MPEW with power on. Surrounding light (7) is collected by the lens structures (2) to give a high light transmission effect. It also results in contrast improvement of printed images (3) by increasing the light transmission in blank areas (H) of the MPEW.

Figure 6:
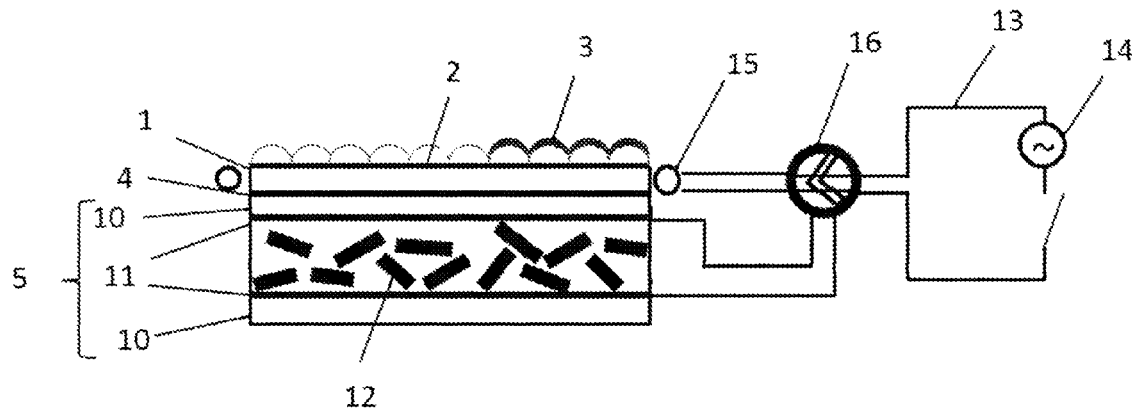
FIG. 6 is a schematic diagram of a printed polymer dispersed liquid crystal electric window with an edge light source.

As shown in FIG. 6, MPEWs can be further integrated with an edge light source (15), i.e. inorganic light emitting diode (LED), and a power controller (16). When the electric window is turned on, the edge light source (15) is turned off. The transparent clear electric window allows the surrounding light to pass through the MPEW. If a single-sided lens sheet is used, the transparent electrode (11) can be sputtered on the smooth side of the transparent sheet (1). The resulting electrodes with lens structures on the opposite side can also have the light guiding function to distribute the light from the edge light source (15) through the entire surface of the MPEW.

Figure 7:
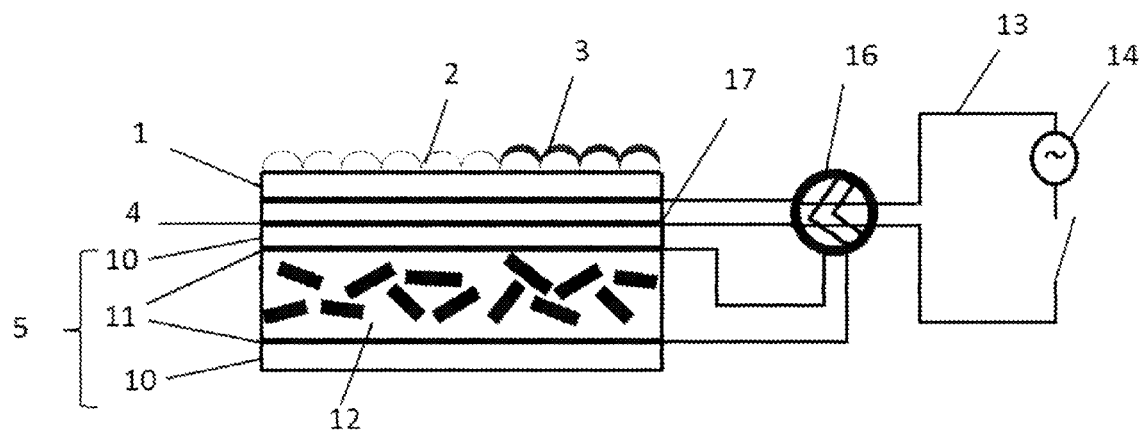
FIG. 7 is a schematic diagram of a printed polymer dispersed liquid crystal electric window with a direct light source.

As shown in FIG. 7, MPEWs can be further integrated with a plane light source (17), e.g. organic light emitting diode (OLED) or an array of LEDs, and a power controller (16). Prism and half spherical lenses can increase the light penetration efficiency of the plane light source (17).

Figure 8:
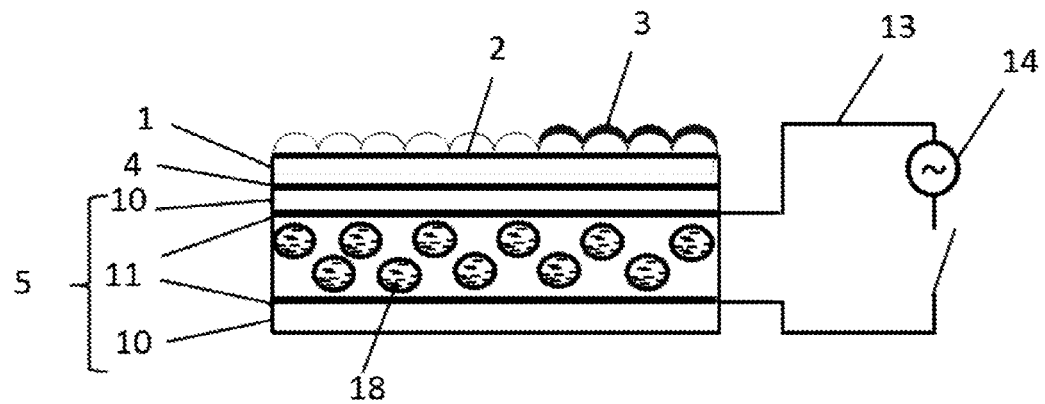
FIG. 8 is a schematic diagram of a printed suspended particle electric window.

A MPEW made with suspended particles (18) has even worse shading effect than that of polymer dispersed liquid crystals (12). The improvement in shading efficiency is more obvious in SPD based MPEW with reflective layer (4), as shown in FIG. 8.

Figure 9:
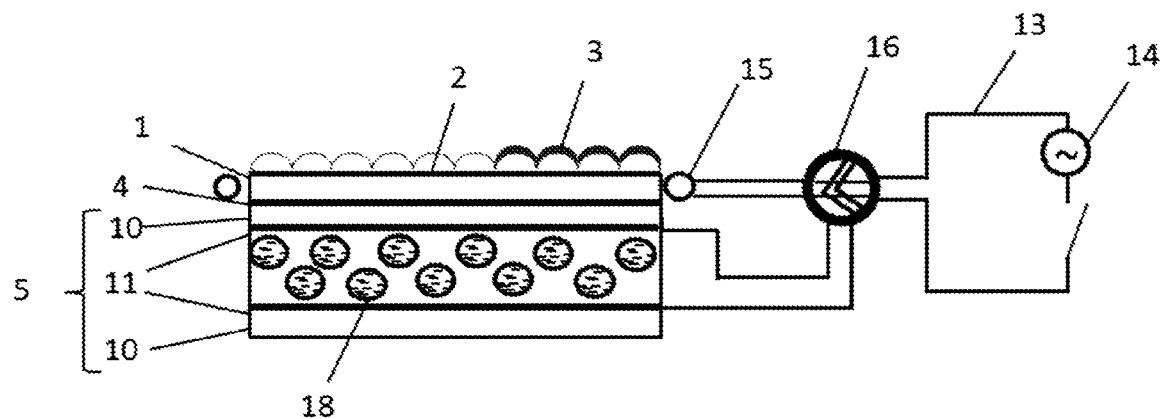
FIG. 9 is a schematic diagram of a printed suspended particle electric window with an edge light source.

FIG. 9 represents a MPEW of suspended particles (18) with a LED as the edge light source (15). A power controller (16) is used to switch power between electric window and LED lighting. When the electric window is powered-off and shaded, the LED light is powered-on to provide lighting for a space.

Figure 10:
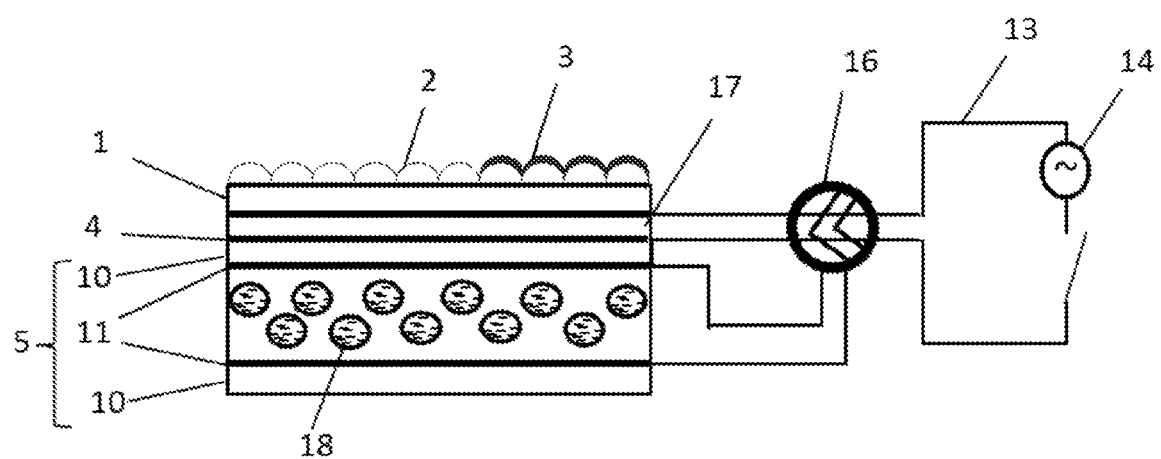
FIG. 10 is a schematic diagram of a printed suspended particle electric window with a direct light source.

As shown in FIG. 10, an electric window with suspended particles (18) can be combined with a plane light source (17), e.g. organic light emitting diode or an array of LEDs. Prism and half spherical lenses can be used to increase the brightness.

For indoor applications, a printed MPEW works very well with integrated light source due to the relatively weak surrounding light. Half spherical lens or double-sided lens sheet (9) can provide high brightness and high contrast of printed images (3). This can offer better eye-catching and alert effects than traditional light box.

The outdoor applications of MPEW include shop windows, advertisement panels and glass doors. When the shop is open, the MPEW can be switched on to be transparent for customers to see the shop facility and products inside on display. When the shop is closed, the MPEW can be turned off and shaded with privacy. Integrated light sources can provide lighting for the side with transparent sheet (1) and lens structures (2). It can light up inside for shop owner's activity or light up outside to maintain the eye-catching effect of a printed advertisement content.

For a printed MPEW, different combinations of lens structures (2) can create different visual effects. The light-switching materials are laminates between electrodes and encapsulated with glasses. Laminated glass structure also improves sound damping effect. In addition, the externally laminated transparent sheet will reduce the chances of the glass from shattering upon impact and hurting people.

This teaching can use a printed transparent sheet adhered to electric light-switching device (5) that comprises two transparent electrodes (11) and a layer of electric field alignable particles layer is selected from polymer dispersed liquid crystal (12) or suspended particles (18). There are printed images (3) on the surface lens structures (2) of the transparent sheet (1). The single-sided or double-sided lens sheets can be used for light guiding function when edge light source (15) is integrated into MPEWs. Digital printing technology can be used with resolution higher than 400 points per inch (PPI). The size of lens structures can be very small. For half spherical lens sheet, lens density can be more than 5,000 lenses per square inch ($L/In^2$). The concave and convex structures are large enough to create the stereoscopic effect without ruining the resolution of printed images (3) in the MPEW. Smaller lenses have less impact in the resolution of printed images, but show less stereoscopic effect of images. Industrial inkjet printers have resolutions higher than 500 PPI, which is equivalent to a printing density of 250,000 points per square inch. For this printing density the best balance between stereoscopic effect and image resolution is lens structures with a density between 25,000 ($L/In^2$) and 200,000 ($L/In^2$). In other words, the ratio between printing density and lens density is preferably higher than 1.25:1, and even more preferably between 5:1 and 10:1.

The transparent sheet can be single layered or multi-layered material selecting from acrylic, polycarbonate, polyurethane, silicone rubber, polyester or cellulous triacetate or a combination of the above.

In this teaching, multi-purpose electric windows (MPEWs) have the following advantages compares to the traditional electric windows.

1. The reflective layer increases the shading effect of MPEW when the MPEW is turned off. The enhanced shading effect in both light and infrared energy results in energy saving for air-conditioning or heater. The shading improvement becomes more prominent when there is a light intensity difference between two sides of the MPEW.

2. The lens structures on the transparent sheet have light gathering effect that enhances the light transmitting through MPEW at daytime. It increases the indoor brightness and reduces the energy consumption for indoor lighting.

3. The printed images replicate the lens structure morphology that creates stereoscopic and lively visual effects on printed images. The reflective layer and lens structures enhance the brightness of blank (non-printed) areas and result in the increase of the contrast ratio of printed images. The eye-catching effect has great commercial value in window advertisement.

EMBODIMENTS

Example embodiments of the present teachings are described below by way of four examples. However, the present invention should be in no way restricted by the examples provided.

The embodiments use same commercial electric window made with polymer dispersed liquid crystal (PDLC) for easy comparison. It is a product from Polytronics Inc. in the U.S. in Texas, under the trade name of Polyvision PDLC. The suspended particles were produced by Hitachi in Japan.

The reflective layer uses nano $TiO_2$ solution from Chang Chiang Chemical Co. in Taiwan.

In order to achieve comparable test results, the same ink, printer, surface modifier and ink protecting material are used in all examples below. Of course, there are equivalent materials and equipment that can achieve equivalent effects; therefore, the examples should not be used to limit the scope of the present invention. A Mitsubishi Diamond 10-color printer is used. Rubber clothes are from Reeves Brother Isotec and rubber cleaning system from Baldwin Impact. The Graphite ink roller is a Diamond brand Blue Max and UV-Oxy ink roller cleaning fluid. Ink-Systems DG931 washing fluid is used before switching to hybrid UV printing. Per gallon of water, the tank solution contains a mix of 3 units of 2451U (Printer's Service Company) and 2 units of non-alkali alcohol alternative solution. Radiant UV light is used with power of 450 watts/sq.in. One set of UV sources is installed on the seventh unit and the tenth unit, and three sets of UV sources are installed on the Glazing Block, and the UV energy is 30% higher than the average UV printing technology. Printing ink is mainly Hybrid UV-Ink Systems (Hybrid UV ink) from Dynagraf Company.

A high reflection index layer with dried thickness between 100 nm and 5 μm can be obtained by the following process. An ethanol $TiO_2$ solution in 20% solid content was mixed with acrylic resin and coated evenly on one side of the transparent plastic (polyethylene terephthalate, PET) sheet, and then dried at 50° C. for 1 hour. The resulting reflective layer was attached to one side of the commercial electric window with a pressure sensitive adhesive with the help of a roller to remove trapped air. Electrical wires were used to connect transparent electrode with power supply.

Images were inkjet printed on the lens structures of a transparent sheet with half spherical lens structures that was then attached to a reflective layer with an adhesive. LED light source was installed at one edge of the transparent sheet. A power controller was wired to connect the transparent electrodes and the LEDs for switching the power supply between the electric window and LED light source.

Images were inkjet printed on the lens structures of the transparent sheet that was then attached to the reflective layer with an adhesive. A layer of OLED light source was attached to the reflective layer with an adhesive. A power controller was wired to connect transparent electrodes and the LEDs for switching the power supply between the electric window and the LED light source.

Embodiment 1

A transparent sheet with one-sided half spherical lens structures was used. It is a product of Kolon company in Korea under the brand name of MLF EverRay®. The sheet is 120 cm long, 80 cm wide and 188 µm thick, made of polyethylene terephthalate (PET, heat deflection temperature of 120° C.), with UV-cured acrylic (heat deflection temperature of 180° C.) half spherical lens structures in 42 µm height. The lens density is 70,000 lenses per square inch. Images were printed with industrial UV-curable inkjet printer in a resolution of 600 PPI (equivalent to printing density of 360,000 points per square inch). The resulting 3D printed decorative film has a printing density 5 times of the lens density, which provides a good stereoscopic visual effect and high image resolution at the same time. Then, the printed lens sheet was attached to the reflective layer with either the lens side or non-lens side to provide the multi-purpose electric window.

Embodiment 2

An 80 µm thick transparent sheet made from a Cellulose triacetate is 120 cm long and 80 cm wide with heat deflection temperature of 80° C. It contains UV-curable epoxy half spherical lenses in 20 µm height with a heat deflection temperature of 250° C. The epoxy resin is EPO-TEK® epoxy. The density of the half spherical lenses is 50,000 per square inch. Images were printed with a UV-curable inkjet printer with a printing resolution of 800 PPI (equivalent to printing density of 640,000 dots per square inch). The resulting printed lens sheet has a printing density 13 times of lens density. Such printed lens sheet provides an excellent stereoscopic effect but relatively low image resolution. Pressure sensitive adhesive was used to attach the resulting lens sheet to electric window. The pressure sensitive adhesive was 8311M Acrylic form Stockwell Elastomeric with a width of 25 µm. The adhesive provides high light transmission and reworkability. The resulting PDLC based multi-purpose electric window was connected to a power source.

Embodiment 3

As shown in FIG. 6, an LED edge light source comprising a layer of OLEDs was integrated to the multi-purpose electric window resulting from embodiment 1. The LEDs are 5 mm away from the transparent sheet and connected to a power controller. The LEDs are F5 white LEDs manufactured by Shanghai Deye S&T Co., Ltd. in China. The power controller is an R-13 87 three-way switch controller made by Shenzhen Yalong Electronics Co., Ltd. in China. This embodiment resulted in a printed multi-purpose electric window with switchable light source.

Embodiment 4

An LED edge light source comprising a layer of OLEDs was integrated to the multi-purpose electric window resulting from embodiment 2. The LEDs are 5 mm away from the transparent sheet and connected to a power controller. The LEDs are F5 white LEDs manufactured by Shanghai Deye S&T Co., Ltd. in China. The power controller is an R-13 87 three-way switch controller made by Shenzhen Yalong Electronics Co., Ltd. in China. This embodiment resulted in a printed multi-purpose electric window with switchable light source.

Moreover, as those of skill in this art will appreciate, many modifications, substitutions and variations can be made in and to a method of making 3D printed decorative film of these example embodiments without departing from its spirit and scope. In light of this, the scope of the present invention should not be limited to that of the particular embodiments illustrated and described herein, as they are only exemplary in nature, but instead, should fully commensurate with that of the claims appended hereafter and their equivalents.

What is claimed is:

1. A multi-purpose electric window comprising a transparent sheet with surface lens structures and a reflective layer laminated on an electric light-switching device, the light-switching device comprising two layers of transparent electrodes and a layer of electric field alignable particles and a power supply, wherein the lens structures are located on one side or, optionally, on both sides of the transparent sheet, wherein the transparent sheet is laminated on the reflective layer or directly on the electric light-switching device where the reflective layer comprises at least one of: transparent resins with high refraction index nano-particles, metal-coated thin film, and a thin metal reflector with surface etched patterns.

2. The multi-purpose electric window of claim 1, wherein the transparent sheet is at least a single-layer of a material selected from acrylic, polycarbonate, polyurethane, silicone rubber, polyester and cellulous triacetate, or is a combination of two or more of the above.

3. The multi-purpose electric window of claim 1 wherein the lens structures are selected from prism, half spherical, half cylindrical, pyramidal, Fresnel structure or are a combination of two or more of the above.

4. The multi-purpose electric window of claim 1 where the reflective layer is laminated on a lens structure side of the transparent sheet.

5. The multi-purpose electric window of claim 1 where the reflective layer is laminated to a lens-free side of transparent sheet.

6. The multi-purpose electric window of claim 1 where images are printed on the lens structures of the transparent sheet.

7. The multi-purpose electric window of claim 1 where the transparent sheet has only one side with lens structures and is coated with a layer of transparent conductive material on the side without lens structures.

8. The multi-purpose electric window of claim 1 wherein the reflective layer comprises titanium oxide nano-particle material.

9. The multi-purpose electric window of claim 1 wherein the electric field alignable particles are selected from polymer disperse liquid crystals and suspended particles.

10. The multi-purpose electric window of claim 1 further comprising a light guide plate that is integrated with the transparent sheet, and a light source.

11. The multi-purpose electric window of claim 10 wherein the light source comprises one or more inorganic light emitting diodes and is located at an edge of the transparent sheet or, optionally, is a layer of organic light emitting diode abutted to the transparent sheet.

12. The multi-purpose electric window of claim 10, further comprising a light-tuning device located between the electric light-switching device and the light emitting diode.

\* \* \* \* \*